United States Patent
Brassac et al.

(10) Patent No.: US 7,574,696 B2
(45) Date of Patent: Aug. 11, 2009

(54) MULTIPROCESSOR APPLICATION INTERFACE REQUIRING NO UTILIZATION OF A MULTIPROCESSOR OPERATING SYSTEM

(75) Inventors: Claude Brassac, Saint Germain En Laye (FR); Alain Vigor, Saint Germain En Laye (FR)

(73) Assignee: Bull S.A., Louviennes (FR)

( * ) Notice: Subject to any disclaimer, the term of this patent is extended or adjusted under 35 U.S.C. 154(b) by 594 days.

(21) Appl. No.: 10/917,499

(22) Filed: Aug. 13, 2004

(65) Prior Publication Data
US 2005/0015749 A1 Jan. 20, 2005

Related U.S. Application Data

(62) Division of application No. 09/858,490, filed on May 17, 2001, now Pat. No. 6,928,539.

(30) Foreign Application Priority Data
May 17, 2000 (FR) .................................. 00 06286

(51) Int. Cl.
*G06F 9/44* (2006.01)
*G06F 11/00* (2006.01)
*G06F 15/177* (2006.01)

(52) U.S. Cl. ............................ 717/127; 717/124; 713/2; 714/25

(58) Field of Classification Search ......... 717/124–127; 713/1, 2; 711/147; 712/28, 32, 245; 714/25
See application file for complete search history.

(56) References Cited

U.S. PATENT DOCUMENTS

| 5,687,073 A * | 11/1997 | Kishimoto ..................... 700/2 |
| 5,867,703 A | 2/1999 | Miller et al. |
| 5,964,890 A * | 10/1999 | Inui et al. ..................... 714/28 |
| 6,179,489 B1 * | 1/2001 | So et al. ..................... 718/102 |
| 6,928,539 B2 * | 8/2005 | Brassac et al. ................. 713/1 |
| 7,137,126 B1 * | 11/2006 | Coffman et al. ............. 719/328 |

FOREIGN PATENT DOCUMENTS

EP 0 335 812 A2 10/1989

OTHER PUBLICATIONS

Firmware, Structure and Architecture, Support for Monitors, Vertical Migration and User Microprogramming, Mamouru Maekawa et al, ACM, 1982, pp. 185-194.*
The Complete Upgrade & Maintenance Guide, Mark Minasi, 1999, pp. 379-405.*
P. Corsini et al., "Multibug: Interactive Debugging in Distributed Systems" IEEE Micro, US, IEEE, Inc., NY, vol. 6, No. 3, pp. 26-33, XP 000719945.
Preliminary Search Report, date of mailing Feb. 28, 2001.

* cited by examiner

*Primary Examiner*—Jason Mitchell
(74) *Attorney, Agent, or Firm*—Miles & Stockbridge P.C.; Eric G. King

(57) ABSTRACT

A test monitor for a multiprocessor machine including a plurality of processors each configured to execute a test by interpreting a script language for writing tests, in which one of the processors executes a kernel part comprising instructions for conducting and monitoring the executed tests according to the scripts, and an application program interface provided using a library of functions for interfacing with firmware of the multiprocessor machine. The test monitor includes a method for executing instruction sequences simultaneously in several processors of a multiprocessor machine.

18 Claims, 3 Drawing Sheets

MULTIPROCESSOR APPLICATION INTERFACE REQUIRING NO UTILIZATION OF A MULTIPROCESSOR OPERATING SYSTEM

CROSS-REFRENCE TO RELATED APPLICATION

This application is a division of application Ser No. 09/858,490 filed May 17, 2001, now U.S. Pat. No. 6,928,539 issued Aug. 9, 2005.

FIELD OF THE INVENTION

The field of application of the invention is the testing of multiprocessor machines. Tests are necessary for debugging a machine in the design phase, for verifying compliance in the production phase, and for maintenance in the operating phase.

DESCRIPTION OF RELATED ART

Testing multiprocessor machines is more difficult than testing single processor machines. In essence, in a single processor machine, a single processor executes only one instruction of the operating system or application tasks at a given time, even though, as a result of time sharing, these tasks seem to be executed simultaneously.

In a multiprocessor machine, several processors can simultaneously execute various instructions that modify the state of the machine. A multiprocessor operating system generally includes functions for dispatching processes to the processors. It is therefore difficult to perform reproducible tests, since the operating system does not necessarily distribute the processes to the processors the same way twice. It is also difficult to control which processor an instruction is executed in at a given time. This results in disadvantages in verifying the behavior of the processors in a multiprocessor environment of the machine, for example in connection with caches of various levels.

BRIEF DESCRIPTION OF THE INVENTION

In order to eliminate the aforementioned disadvantages, a first subject of the invention is a method for executing instruction sequences simultaneously in several processors of a multiprocessor machine, characterized in that it comprises:
  a first step in which a single processor operating system is booted in a first processor;
  a second step in which the first processor orders at least one other processor of the machine to execute one or more instruction sequences under the control of said first processor.

Thus, this method makes it possible to execute several test code sequences simultaneously in several processors, while controlling which processor a given test code sequence is executed in. This method constitutes a simple way to conduct tests in a multiprocessor context. In essence, the single processor operating system has no effect on the operation of the processors apart from the first processor.

A second subject of the invention is a test monitor for implementing a method according to the invention.

BRIEF DESCRIPTION OF THE DRAWINGS

Other details and advantages of the invention appear in the following description in reference to the figures, in which.

DETAILED DESCRIPTION OF THE PREFERRED EMBODIMENT(S)

Figure 1:
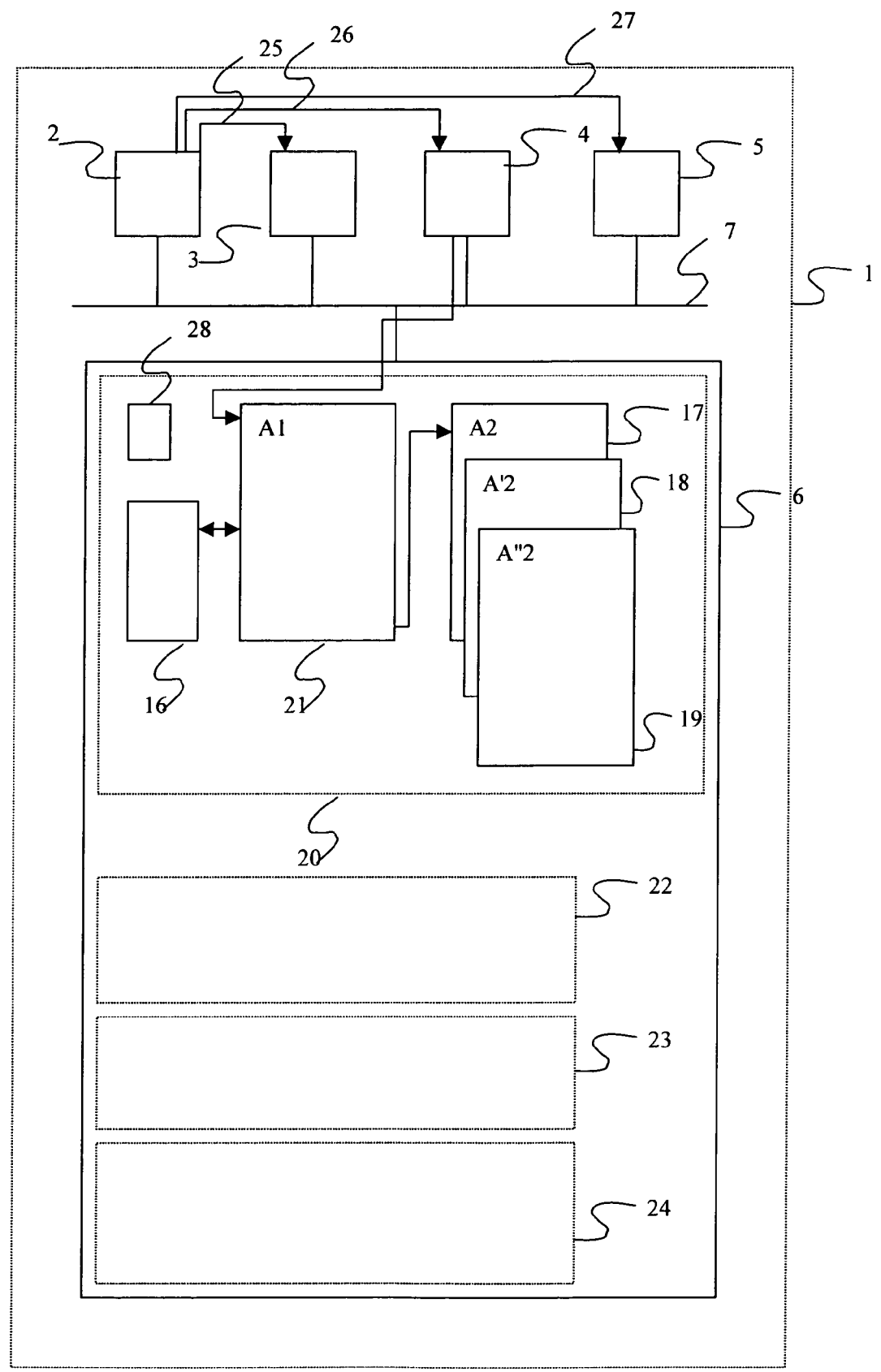
FIG. 1 presents a multiprocessor machine.

Referring to FIG. 1, a machine 1 comprises several processors 2, 3, 4, 5, which access a memory 6 via a bus 7.

Figure 2:
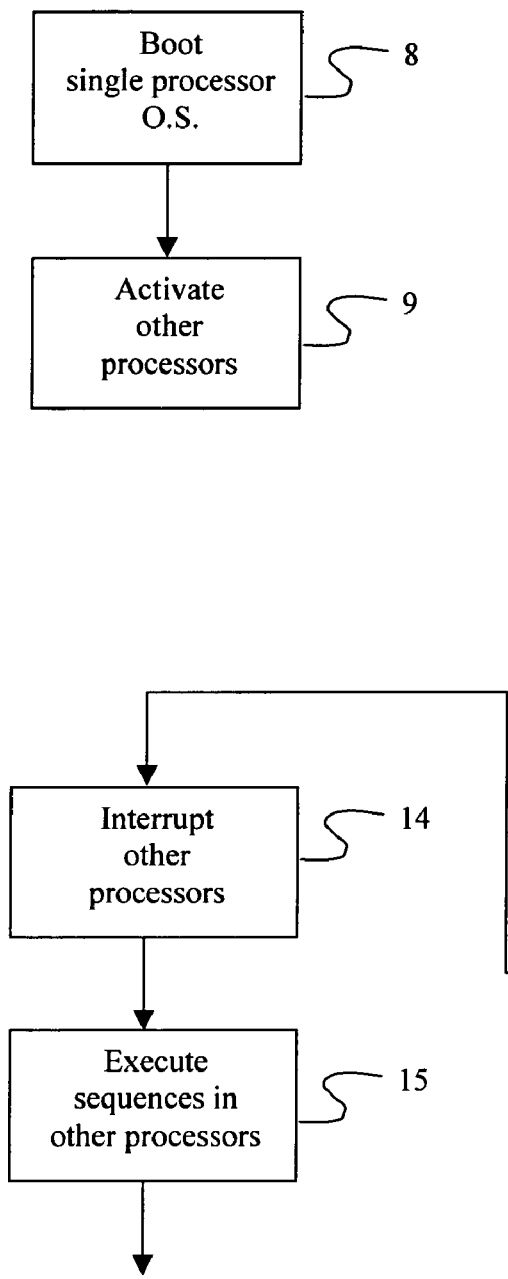
FIG. 2 presents the main steps of the method.

Referring to FIG. 2, a simplified, single processor operating system (OS) is booted in the processor 2 in a step 8. The processor 2, also called a BSP (for Bootstrap Processor) is distinguished from the other processors, also called AP (for Application Processor), in that the simplified single processor operating system sees only the processor 2. The single processor operating system is booted by firmware functions of the machine, also known as the BIOS (Basic Input Output System), which constitutes a routine linking the operating system and the hardware. These firmware functions are generally stored in permanent memories, which associate them with the hardware functions performed by means of microcircuits. The single processor operating system allows the processor 2 to activate a step 9 in which the processor 2 runs a test application while ordering the other processors 3, 4, 5 to execute instruction sequences.

Figure 3:
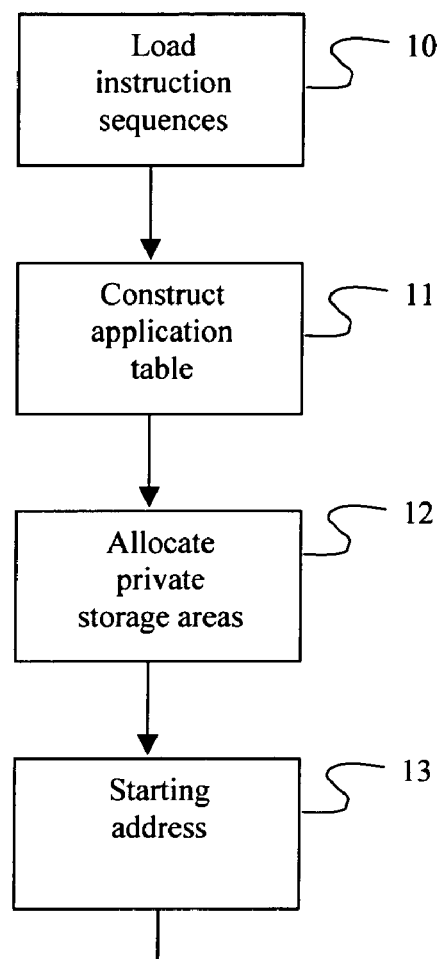
FIG. 3 presents the essential phases of one step.

Step 2 comprises several phases explained in reference to FIG. 3.

In a phase 10, the processor 2 loads into a storage area 20 an instruction sequence 21 at an address A1, and one or more instruction sequences 17, 18, 19 at an address A2, A'2, A"2. The instruction sequences 17, 18, and 19 are available in disk files, not represented, into which they have been written beforehand, for example by an independent computer. Advantageously, the instruction sequence 21 is written in assembly language, since it directly uses processor instructions that serve to initialize the processor registers, so as to enable a processor to execute a programmed sequence. The instruction sequences 17, 18, 19 in this case constitute test code sequences. Advantageously, the test code sequences are obtained by programming in an advanced language, for example C language. The processor 2 also loads into the storage area 20 a system of locks on certain resources of the machine 1.

In a phase 11, the processor 2 uses firmware functions of the BIOS to index each of the other processors 3, 4, 5 of the machine 1. These functions generally use firmware configuration tables of the machine. The processor 2 then constructs, in the storage area 20, an application table 16 with several rows, wherein each row is accessible by means of an identifier of a processor of the machine. For each row of the table 16, the processor associates a storage area 22, 23, 24, respectively specific to each processor 3, 4, 5. The processor 2 then stores, in each row of the table 16, data required to establish an execution context for each processor 3, 4, 5 whose identifier references this row. Appearing among this data, for example, is an address A2, A'2, A"2 of the sequence 17, 18, 19 to be executed by the processor 3, 4, 5 whose identifier references this row. A row of the table 16 can contain a different address than that contained in another row if the associated processors are called to execute different instruction sequences, or identical addresses if the associated processors are called to execute the same instruction sequences.

In a phase 12, the processor 2 allocates a private storage area 22, 23, 24 to each processor 3, 4, 5 by storing, in the corresponding row of the table 16, a starting address and a private storage area size.

In a phase 13, the processor 2 uses a firmware function of the BIOS to store the starting address A1 of the instruction sequence 21 in a firmware bootstrap table 28. The table 28 is provided in order to give the address at which a processor starts when it receives an interrupt.

In a phase 14, the processor 2 sends an interrupt 25, 26, 27, to the respective processor or processors 3, 4, 5 intended to be tested.

In a phase 15, when the processor 4 receives the interrupt 26, it is branched by the interrupt controller to the entry point of the instruction sequence 21. While executing the instruction sequence 21, the processor 4 uses its identifier to consult the row of the table 16 that is associated with it, in order to initialize it. In particular, the processor 4 constructs in its private storage area 23, using the sequence 21, data structures such as execution stacks required to establish an execution context. The instruction sequence ends with a call to a testing procedure, which in the execution context of the processor 4, for example, is the test code sequence 17. The processor 4 then executes its specific sequence 17. Advantageously, the programming of the sequence 23 provides for the utilization of the lock structure created in phase 11 in order to maintain the consistency of the resources of the machine 1, which is accessed by the other processors 3, 5 as in a multiprocessor operating system.

The explanations of the preceding phases 14 and 15 for the processor 4 are also valid for any processor 3, 5. Thus, each processor 3, 4, 5 executes its own test code sequence 17, 18, 19 in parallel. Several processors can also execute the same test sequence 17 if the same address A2 has been stored in the table 16. After the execution of the test code sequences 17, 18, 19, the machine 1 is in a controlled, and hence reproducible, state, available for the execution of new code sequences by repeating phases 12 through 15.

Figure 4:
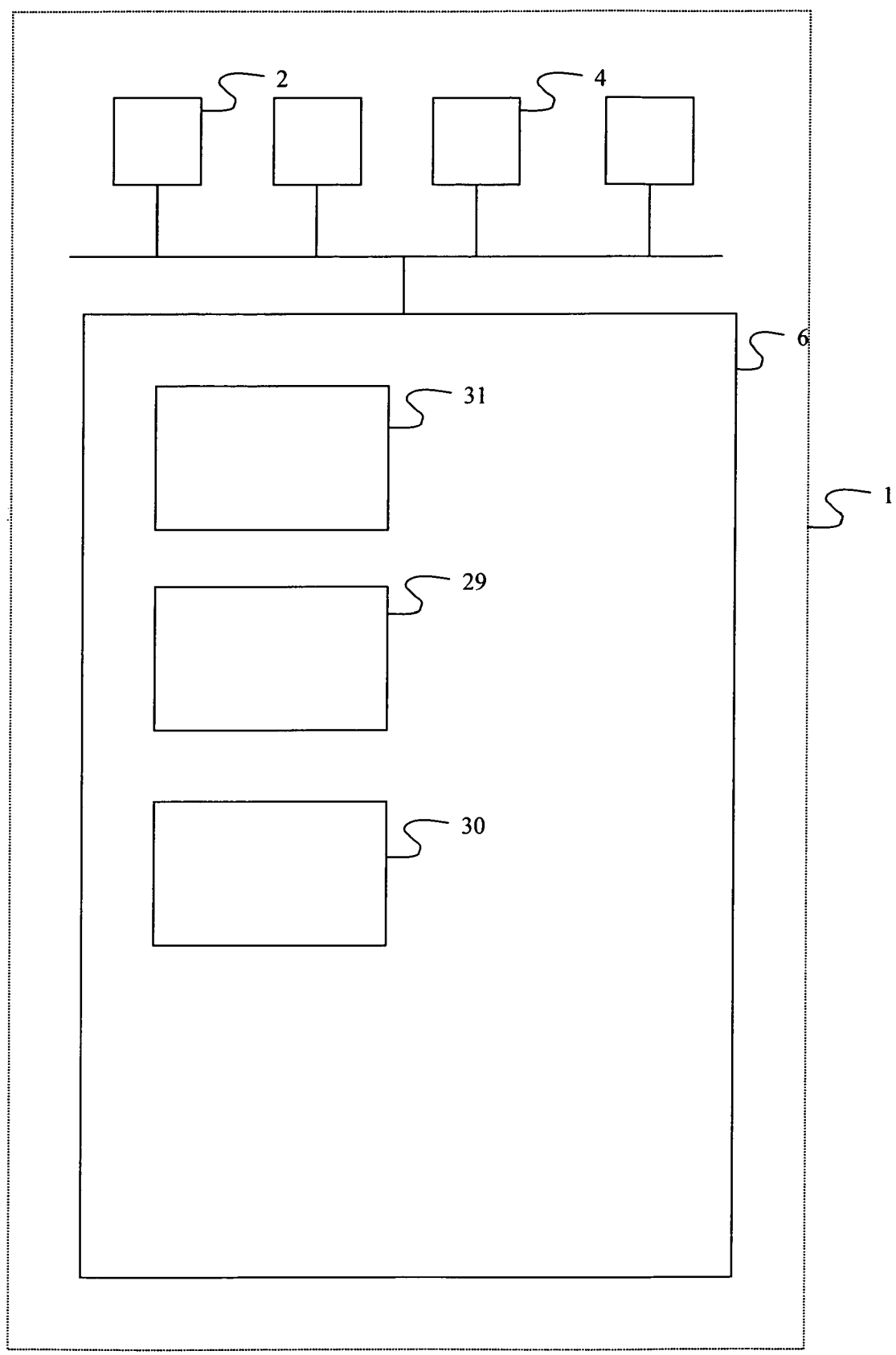
FIG. 4 presents the elements of a test monitor.

Referring to FIG. 4, a test monitor according to the invention comprises, in a memory 6 of the machine, a program 31 designed to interpret a script language intended for those who write the tests, a program 29 that constitutes a kernel part for conducting the tests according to the scripts, and a library 30 of functions that constitutes an application program interface (API) with the firmware of the machine 1.

When a user wants to perform a series of tests in a multiprocessor environment, he starts the test monitor, which runs on the simplified single processor operating system. This has the effect of activating the kernel 29, which implements phases 10 through 14 using functions contained in the library 30. Each processor activated by phase 14 then triggers phase 15 using the functions of the library 30.

The library 30 contains a function for constructing the table 16 in phase 11 that calls firmware processor identification functions, a function for allocating an execution context to an application processor in phase 12, a function for storing a starting point for the application processor in phase 13, a function for starting one application processor independently from the others in phase 14, and lock functions.

The lock functions are not the standard lock functions of the single processor operating system which, having only a few instructions, can be executed simultaneously in various processors. These lock functions are performed by means of known atomic operations such as Test&Set, Load&Reserve. Remember that an atomic operation is such that no other operation can be performed between the start and the end of the operation. For further details, please refer, for example, to French patent 2754925, corresponding to U.S. Pat. No. 6,128,709.

The invention claimed is:

1. A test monitor for a multiprocessor machine, comprising:
    a plurality of test execution processors each configured to execute a test by interpreting a script language for writing tests defining a test script,
    a test monitor processor that executes a kernel part comprising instructions that configure said monitor processor for conducting and monitoring the executed tests according to test scripts, said test monitor processor determining which one of said test execution processors executes a corresponding test script to control execution of said executed tests, and
    an application program interface provided using a library of functions for interfacing said test monitor processor with firmware of the multiprocessor machine,
    wherein said library of functions comprises:
        a function for constructing a table that calls firmware processor identification functions;
        a function for allocating an execution context to a test execution processor;
        a function for storing a starting point for a test execution processor;
        a function for starting each said test execution processor independently from the other test execution processors; and
        resource lock functions.

2. The test monitor of claim 1, wherein said test execution processors are configured to execute said tests in parallel under the control of said test monitor processor.

3. The test monitor of claim 2, wherein a single processor operating system is booted in said test monitor processor.

4. The test monitor of claim 1, further comprising:
    a plurality of private storage areas, each said private storage area being associated with a corresponding test execution processor.

5. A. multiprocessor test method comprising:
    loading, by a first processor, a test monitoring instruction sequence into a storage area associated with said first processor;
    loading, by said first processor in accordance with said test monitoring instructions sequence, one or more test execution instruction sequences into storage areas each associated with a corresponding one of a plurality of second processors, each said test execution instruction sequence comprising instructions for conducting a multiprocessor test according to a test script;
    interfacing said first processor with firmware of a multiprocessor machine using an Application Program Interface (API) that includes a library of functions; and
    initiating execution of said one or more test execution instruction sequences by one or more corresponding said second processors under control of said first processor according to a kernel part,
    wherein said library of functions comprises:
        a function for constructing a table that calls firmware processor identification functions;
        a function for allocating an execution context to a test execution processor;
        a function for storing a starting point for a test execution processor;
        a function for starting each said test execution processor independently from the other test execution processors; and
        resource lock functions.

6. The multiprocessor test method of claim 5, further comprising:
loading, by said first processor, one or more resource locks into said storage area.

7. The multiprocessor test method of claim 5, wherein said test monitoring instruction sequence executed by said first processor is a single processor operating system.

8. The multiprocessor test method of claim 5, further comprising:
indexing, by said first processor, each said second processor using firmware functions of a Basic Input/Output System (BIOS), the firmware functions being associated with configuration tables of a multiprocessor machine; and
constructing, by said first processor, an application table that includes a plurality of rows each accessible using an identifier associated with one of said second processors of the multiprocessor machine.

9. The multiprocessor test method of claim 8, wherein at least two of said rows contain an identical address to cause each said second processor associated with each said at least two rows to execute the same test execution instruction sequence.

10. The multiprocessor test method of claim 8, further comprising:
allocating, by said first processor, a private storage area to each said second processor by storing, in a corresponding row of said application table, a starting address and a private storage area size.

11. The multiprocessor test method of claim 8, further comprising:
storing, by said first processor, a starting address for the test monitoring instruction sequence in a firmware bootstrap table.

12. The multiprocessor test method of claim 5, wherein said initializing further comprises:
sending an interrupt, by said first processor, to one or more of said second processors to be tested.

13. The multiprocessor test method of claim 5, wherein the test monitoring instruction sequence is implemented using assembly language instructions that include processor instructions that serve to initialize the processor registers; and
wherein the test code execution instruction sequences are implemented in the C programming language.

14. A machine readable medium upon which is encoded a sequence of instructions which, when executed by a processor, cause the processor to perform a multiprocessor test method in accordance with the instructions, comprising:
loading, by a first processor, a test monitoring instruction sequence into a storage area associated with said first processor;
loading, by said first processor in accordance with said test monitoring instructions sequence, one or more test execution instruction sequences into storage areas each associated with a corresponding one of a plurality of second processors, each said test execution instruction sequence comprising instructions for conducting a multiprocessor test according to a test script;
interfacing said first processor with firmware of a multiprocessor machine using an Application Program Interface (API) that includes a library of functions;
initiating execution of said one or more test execution instruction sequences by one or more corresponding said second processors under control of said first processor according to a kernel part;
indexing, by said first processor, each said second processor using firmware functions of a Basic Input/Output System (BIOS), the firmware functions being associated with configuration tables of a multiprocessor machine; and
constructing, by said first processor, an application table that includes a plurality of rows each accessible using an identifier associated with one of said second processors of the multiprocessor machine,
wherein at least two of said rows contain an identical address to cause each said second processor associated with each said at least two rows to execute the same test execution instruction sequence.

15. The machine readable medium of claim 14, further comprising:
loading, by said first processor, one or more resource locks into said storage area.

16. The machine readable medium of claim 14, wherein said test monitoring instruction sequence executed by said first processor is a single processor operating system.

17. The computer readable medium of claim 14, further comprising:
allocating, by said first processor, a private storage area to each said second processor by storing, in a corresponding row of said application table, a starting address and a private storage area size; and
storing, by said first processor, a starting address for the test monitoring instruction sequence in a firmware bootstrap table;
wherein said initializing further comprises sending an interrupt, by said first processor, to one or more of said second processors to be tested.

18. The computer readable medium of claim 14, wherein the test monitoring instruction sequence is implemented using assembly language instructions that include processor instructions that serve to initialize the processor registers; and
wherein the test code execution instruction sequences are implemented in the C programming language.

* * * * *